(12) United States Patent
Toda et al.

(10) Patent No.: US 7,512,384 B2
(45) Date of Patent: Mar. 31, 2009

(54) CONTROL UNIT AND A CONTROL METHOD

(75) Inventors: Takeshi Toda, Tokyo (JP); Takeshi Takano, Kawasaki (JP); Yuuta Nakaya, Kawasaki (JP); Yasuyuki Oishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 763 days.

(21) Appl. No.: 11/044,628

(22) Filed: Jan. 27, 2005

(65) Prior Publication Data

US 2005/0146387 A1 Jul. 7, 2005

Related U.S. Application Data

(63) Continuation of application No. PCT/JP02/11460, filed on Nov. 1, 2002.

(51) Int. Cl.
*H03C 1/52* (2006.01)
(52) U.S. Cl. .................. 455/107; 455/120; 455/121; 455/575.7
(58) Field of Classification Search ............... 455/120, 455/121, 107, 575.7
See application file for complete search history.

(56) References Cited

U.S. PATENT DOCUMENTS

| | | | | |
|---|---|---|---|---|
| 4,201,960 | A * | 5/1980 | Skutta et al. ............... 333/17.3 |
| 4,961,062 | A | 10/1990 | Wendler | |
| 5,778,308 | A * | 7/1998 | Sroka et al. ............... 455/115.1 |
| 6,242,989 | B1 | 6/2001 | Barber et al. | |
| 6,765,540 | B2 * | 7/2004 | Toncich ....................... 343/860 |
| 6,920,315 | B1 * | 7/2005 | Wilcox et al. ............... 455/121 |
| 7,176,845 | B2 * | 2/2007 | Fabrega-Sanchez et al. . 343/861 |

FOREIGN PATENT DOCUMENTS

| | | |
|---|---|---|
| DE | 43 21 805 | 1/1994 |
| EP | 0 986 077 | 3/2000 |
| JP | 55-137703 | 10/1980 |
| JP | 3-30508 | 2/1991 |
| JP | 4-111502 | 4/1992 |
| JP | 19920413 | * 4/1992 |

(Continued)

OTHER PUBLICATIONS

International Search Report dated Feb. 25, 2003.
Robert J. Dinger. A Planar Version of a 4.0 GHz Reactively Steered Adaptive Array. IEEE Transactions on Antennas and Propagation. vol. AP-34, No. 3, Mar. 1986.

(Continued)

*Primary Examiner*—Nick Corsaro
*Assistant Examiner*—Vladimir Magloire
(74) *Attorney, Agent, or Firm*—Katten Muchin Rosenman LLP

(57) ABSTRACT

A control unit and a control method are disclosed. First and second changing units change impedances of two or more first and second components within predetermined first and second ranges, respectively, the first and the second components affecting an output signal. An evaluation function value calculating unit calculates an evaluation function value that is dependent on the impedances of the first and the second components. A gradient vector calculating unit calculates a gradient vector based on the difference between the evaluation function values before and after the impedance change of the second components. Based on the gradient vector, impedance of each of the first components is changed such that the evaluation function value takes a desired value.

16 Claims, 6 Drawing Sheets

FOREIGN PATENT DOCUMENTS

| | | |
|---|---|---|
| JP | 6-21711 | 1/1994 |
| JP | 2569925 | 10/1996 |
| JP | 2000-100659 | 4/2000 |
| JP | 2002-118414 | 4/2002 |
| WO | 01/03288 A1 | 1/2001 |
| WO | 01/67548 | 9/2001 |

OTHER PUBLICATIONS

Robert J. Dinger. Reactively Steered Adaptive Array Using Microstrip Patch Elements at 4.0 GHz. IEEE Transactions on Antennas and Propagation. vol. AP-32, No. 8, Aug. 1984.

Japanese Office Action mailed Apr. 10, 2007, from the corresponding Japanese Application.

* cited by examiner

CONTROL UNIT AND A CONTROL METHOD

CROSS-REFERENCE TO RELATED APPLICATION(US VERSION)

This application is a U.S. continuation application filed under 35 USC 111 (a) claiming benefit under 35 USC 120 and 365 (c) of PCT International Application No. PCT/JP02/11460 filed on Nov. 1, 2002, which is hereby incorporated herein by reference.

BACKGROUND OF THE INVENTION

1. Technical Field of the Invention

The present invention generally relates to a control unit and a control method of appropriately maintaining an output signal of a nonlinear system by carrying out adaptive control of variable impedance components, and especially relates to a control unit and a control method of appropriately maintaining a signal received by an adaptive antenna system that has two or more antenna elements.

2. Description of the Related Art

In the technical field, appropriately maintaining an output signal is often carried out by optimizing impedance by an optimization technique that uses a perturbation method in a nonlinear system wherein an output signal changes depending on the impedance of two or more components.

FIG. 1 is a conceptual diagram showing an example of a conventional control system 100. The control system 100 serves a radio frequency (RF) processing type adaptive antenna system, and is a nonlinear system wherein the impedances of two or more RF components (L, C) are unknown, and two or more received signals are added and output. The control system 100 includes two or more antenna elements 102, the quantity of which is expressed as M+1, and an adder 104 that combines signals from the antenna elements 102. The output of the adder 104 is provided to an analog-to-digital converter 106. The output of the analog-to-digital converter 106 is provided to a control unit 108.

Out of the M+1 antenna elements, each of M antenna elements includes a phase shift circuit 110 that consists of an inductor $L_i$ connected in series and a capacitor $C_i$ (i=1, ..., M) connected in parallel to the antenna element 102. The inductance of the inductor $L_i$ and the capacitance of the capacitor $C_i$ are adjusted by a control signal provided by the control unit 108. Contents $x_i$ (i=1, ..., 2M) of the control signal specify a signal for setting up the impedance of the inductor $L_i$ and the capacitor $C_i$.

FIG. 2 is a flowchart showing a control flow 200 of the control system 100 mainly performed by the control unit 108, the control flow 200 employing the perturbation method. The control flow 200 starts at Step 202. At Step 204, impedance $x_i$ of two or more components (inductors $L_i$ and capacitors $C_i$) is set at a suitable initial value. At Step 206, a parameter m relevant to the number of repetition times of the process is set at an initial value 0.

At Step 208, an evaluation function value f(x) is obtained, where f(x) varies depending on a signal y(x), where $x=x_1$, $x_2$, ..., $x_{2M}$, output by the analog-to-digital converter 106 (FIG. 1). The evaluation function value is stored as a fiducial point $f_0(x)$.

At Step 210, the parameter m is incremented by one.

At Step 212, the value of the impedance $x_m$ of the m-th component is changed to $x_m + \Delta x_m$. For example, if the value of m is 1, a minute change is added to the value of the inductor $L_i$. The minute change causes the output signal y(x) to change.

At Step 214, the evaluation function value f(x) is calculated based on the output signal y(x).

At Step 216, a slope (gradient) vector $\nabla f$ is calculated by computing the difference between the evaluation function values f(x) before and after the minute change of the impedance $x_m$. The gradient vector $\nabla f$ is a vector quantity that has 2M components, and each component is calculated by the following formula.

$$(\nabla f)_{xm} = f(x_1, \ldots, x_m + \Delta x_m, \ldots, x_{2M}) - f_0(x_1, \ldots, x_m, \ldots, x_{2M})$$

At Step 218, the added minute change $\Delta x_m$ is deducted, and the value of $x_m$ returns to the original value.

At Step 220, it is determined whether the parameter m is equal to or less than 2M. If the determination is affirmative, the process returns to Step 208, and other components of the gradient vector $\nabla f$ are calculated. Otherwise, if m is determined to be greater than 2M, all the components of the gradient vector $\nabla f$ have been calculated.

At Step 222, the impedance value $x_i$ is updated using the calculated gradient vector $\nabla f$. The gradient vector $\nabla f$ represents the direction in which a slope (inclination) changes most rapidly in the coordinate $(x_1, x_2, \ldots, x_{2M})$ of the curved surface expressed by f. That is, the maximum or the minimum value (the desired optimal value) of the evaluation function value f is present in the direction indicated by $\nabla f$. Accordingly, the impedance value x is updated to $x + \alpha \nabla f$, where $\alpha$ represents a step size in the direction of $\nabla f$.

At Step 224, it is determined whether the impedance value is satisfactorily converged by comparing the impedance value with the previous impedance value. If negative, the process returns to Step 206 for further updating. If affirmative, the process proceeds to Step 226, and the control flow 200 is ended.

The optimization technique wherein the gradient vector $\nabla f$ is calculated, and the impedance value is updated by adding a minute change to the impedance using the perturbation method has been disclosed by, e.g., JPA 2002-118414, Robert J Dinger, "A Planar Version of a 4.0 GHz Reactively Steered Adaptive Array", IEEE TRANSACTIONS ON ANTENNAS AND PROPAGATION, vol. AP-34, No.3, March 1986, and Robert J Dinger, "Reactively Steered Adaptive Array Using Microstrip Patch Components at 4.0 GHz", IEEE TRANSACTIONS ON ANTENNAS AND PROPAGATION, vol. AP-32, No.8, August 1984.

It is common for the above control technique to use a semiconductor integrated circuit to form the variable impedance component such as a variable inductor and a variable capacitor. However, while the common practice is advantageous in that a high response speed is available when changing the impedance, a disadvantage is that high power is consumed. This is particularly disadvantageous for a small appliance that uses a battery.

On the other hand, an impedance variable component is available, wherein the impedance is mechanically changed using a micro electro mechanical system (MEMS). The impedance can be changed by various methods, and examples are to change the impedance by changing the interval between two plates of a capacitor, and by changing the amount of insertion of a magnetic core of an inductor. Indeed, the MEMS type component consumes very little power, compared with the semiconductor integrated circuit, and it is possible to solve the problem concerning power consumption. However, the response time of the MEMS component tends to be longer than the semiconductor integrated circuit for the same impedance. Especially, when a process such as the control flow 200 is used in order to obtain a gradient vector ∇f, the slow response poses a problem in that the gradient vector ∇f cannot be promptly calculated. That is, an MEMS type component is not capable of accurately following changes in a nonlinear system.

SUMMARY OF THE INVENTION

A general objective of the present invention is to offer a control unit and a control method that provide a high-speed control of the impedance of two or more components that affect an output signal of a nonlinear system such that the output signal is maintained at a satisfactory level.

A specific objective of the present invention is to offer a control unit and a control method that provide a low-power-consumption and high-speed control of the impedance of two or more components that affect an output signal of a nonlinear system such that the output signal is maintained at a satisfactory level.

These objectives are achieved as follows.

The present invention provides:

a first changing unit configured to change impedance of each of two or more first components that affect the property of an output signal within a first range;

a second changing unit configured to change impedance of each of two or more second components that affect the property of the output signal within a second range, the second range being narrower than the first range;

an evaluation function calculating unit configured to calculate an evaluation function value that depends on the impedances of the first and the second components based on the output signal; and a gradient vector calculating unit configured to calculate a gradient vector based on a difference between the evaluation function values before and after the impedance change of the second components, wherein each of the impedances of the first components is changed based on the gradient vector such that the evaluation function value takes a desired value.

DESCRIPTION OF THE PREFERRED EMBODIMENTS

In the following, embodiments of the present invention are described with reference to the attached drawings.

Figure 3:
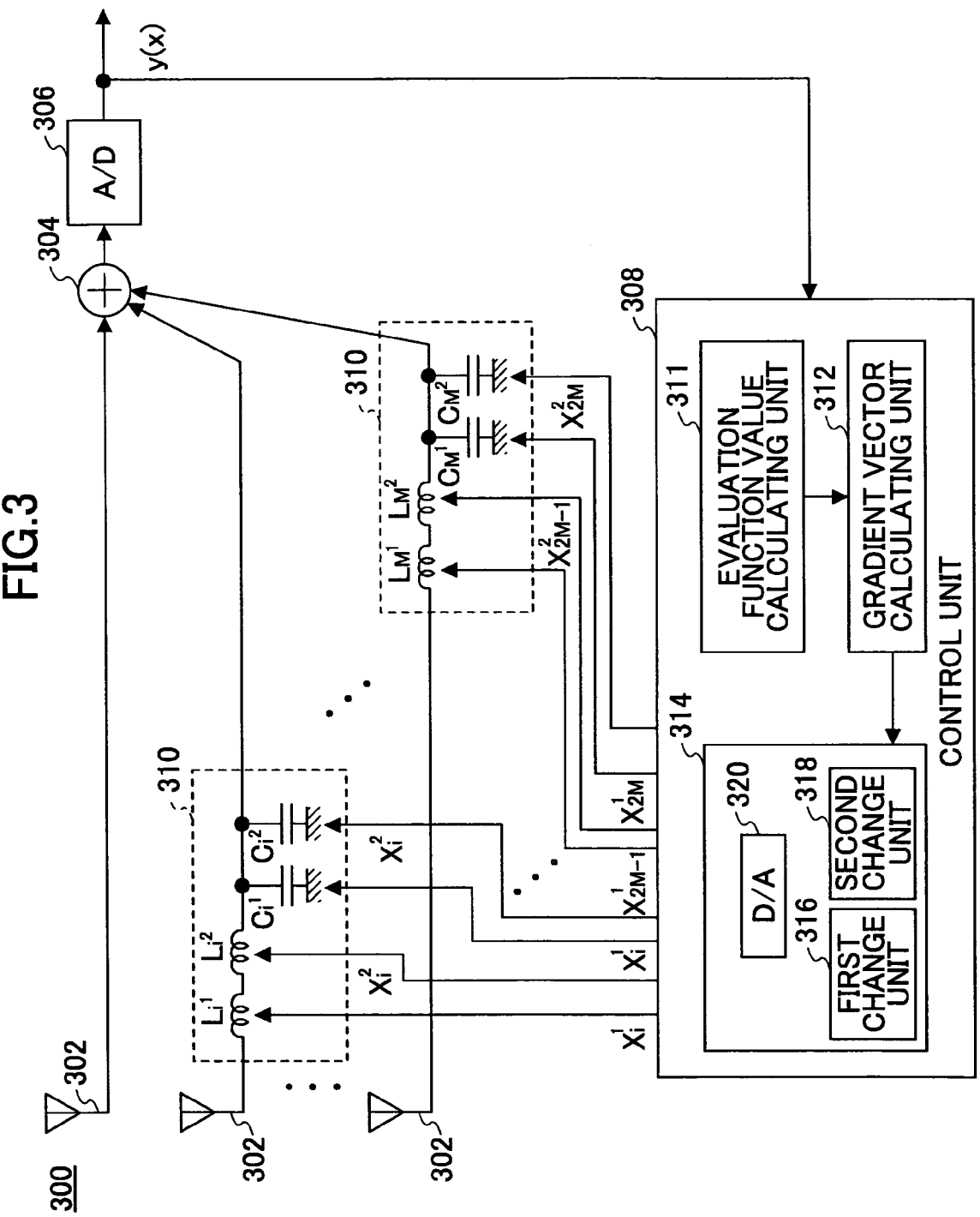
FIG. 3 is a block diagram of an example of a control system according to the first embodiment of the present invention.

FIG. 3 is a block diagram showing an example of a control system 300 according to the first embodiment of the present invention. The control system 300 serves as a radio frequency (RF) processing type adaptive antenna system, and is a nonlinear system wherein impedances of two or more RF components are unknown, and two or more received signals are combined to form an output signal. The control system 300 includes antenna elements 302, the quantity of which is M+1, and an adder 304 configured to add the signals received by the M+1 antenna elements 302. The output of the adder 304 is provided to an analog-to-digital converter 306. The output of the analog-to-digital converter 306 is provided to a control unit 308.

To each of M antenna elements 302 out of the M+1 antenna elements 302, a phase shift circuit 310 is connected. The phase shift circuit 310 consists of a first inductor $L_i^1$ and a second inductor $L_i^2$ connected in series to the antenna element 302, and a first capacitor $C_i^1$ and a second capacitor $C_i^2$ connected in parallel. Here, i=1, . . . , M. The first and the second inductors $L_i^1$ and $L_i^2$, and the first and the second capacitors $C_i^1$ and $C_i^2$ are MEMS (micro electro mechanical system) components, the impedance of which is mechanically variable. Although a semiconductor device can serve as the components, the MEMS components are used in order to reduce power consumption. The inductance of the first and the second inductor $L_i^1$ and $L_i^2$, and the capacitance of the first and second capacitors $C_i^1$ and $C_i^2$, respectively, are adjusted by a control signal from the control unit 308. The control signal contains control signals $x_i^1$ and $x_i^2$ (i=1, . . . , 2M) that specify the inductance of the inductors $L_i^1$ and $L_i^2$, and the capacitance of the capacitors $C_i^1$ and $C_i^2$ Specifically, the control signal $x_i^1$ controls the first components, namely, the first inductor $L_i^1$ and the first capacitor $C_i^1$, and the control signal $x_i^2$ controls the second components, namely, the second inductor $L_i^2$ and the second capacitor $C_i^2$ The inductance of the first inductor $L_i^1$ and the capacitance of the first capacitor $C_i^1$ are greatly changeable such that a magnitude of impedance (inductance/capacitance) change is great enough to optimize the property of the output signal (output signal from the digital-to-analog converter 306) of the nonlinear system. For this reason, the sizes of the first inductor $L_i^1$ and the capacitance of the first capacitor $C_i^1$ are relatively great, and their response speeds tend to be comparatively low. On the other hand, the second inductor $L_i^2$ and the second capacitor $C_i^2$ are of small size, and are capable of varying the respective impedance in a small range. Accordingly, the response speeds of the second inductor $L_i^2$ and the second capacitor $C_i^2$ are higher than the response speeds of the first inductor $L_i^1$ and the first capacitor $C_i^1$, respectively.

The control unit 308 of the adaptive antenna system 300 includes an evaluation function value calculating unit 311 configured to calculate an evaluation function value f(x) based on a signal y(x) output by the analog-to-digital converter 306. Here, x represents a vector quantity pertaining to all the impedances, and is expressed as $x=(x_1^1, x_1^2, x_2^1, x_2^2, \ldots, x_{2M}^1, x_{2M}^2)$. As for the evaluation function value f(x), various values can be used, such as a correlation value |y(x) d| between a known signal pattern d, such as a pilot signal and a training signal, and the received signal y(x). Further, a signal-to-noise ratio and a signal-to-noise interference ratio may be used as the evaluation function value f(x). Alternatively, it is also possible to use the total power of the signals received by the antenna elements 302 as described below. In short, as the evaluation function value f(x), any quantity that varies with changes of the impedance x, and that is available for optimizing the output signal (received signal y(x)) of the nonlinear system can be used.

The control unit 308 includes a gradient vector calculating unit 312, to which the output signal of the evaluation function value calculating unit 311 is provided. The gradient vector calculating unit 312 calculates a slope ∇f of the evaluation function value f at the impedance vector x by computing the difference between the evaluation function values f(x) before and after the change of the impedance vector x. The output of the gradient vector calculating unit 312 is provided to a changing unit 314 that is configured to change the impedance value. Specifically, the changing unit 314 includes a first changing unit 316 configured to change the inductance of the first inductor $L_i^1$ and the capacitance of the first capacitor $C_i^1$ change. Further, the changing unit 314 includes a second changing unit 318 configured to change the inductance of the second inductor $L_i^2$ and the capacitance of the second capacitor $C_i^2$. It should be noted that the amount of impedance change by the second changing unit 318 is very small as described above.

The changing unit 314 further includes a digital-to-analog converter 320 configured to convert digital signals from the first and the second changing units 316 and 318 into analog signals, and to provide the control signals $x_i^1$ and $x_i^2$ to the first and the second inductors $L_i^1$ and $L_i^2$ respectively, and to the first and the second capacitors $C_i^1$ and $C_i^2$, respectively. The digital-to-analog converter 320 can be configured to serve both the first component and the second component; or alternatively, separate digital-to-analog converters may be provided to separately serve the first and the second components. When the digital-to-analog converter 320 serves both, a switch is provided. The switch is for switching the output of the digital-to-analog converter 320 for the cases when the impedance of the second component is changed such that a gradient vector is calculated, and when the impedance of the first component is changed. In this manner, the number of digital-to-analog converters can be reduced to one, and a smaller circuit area is needed.

Figure 4:
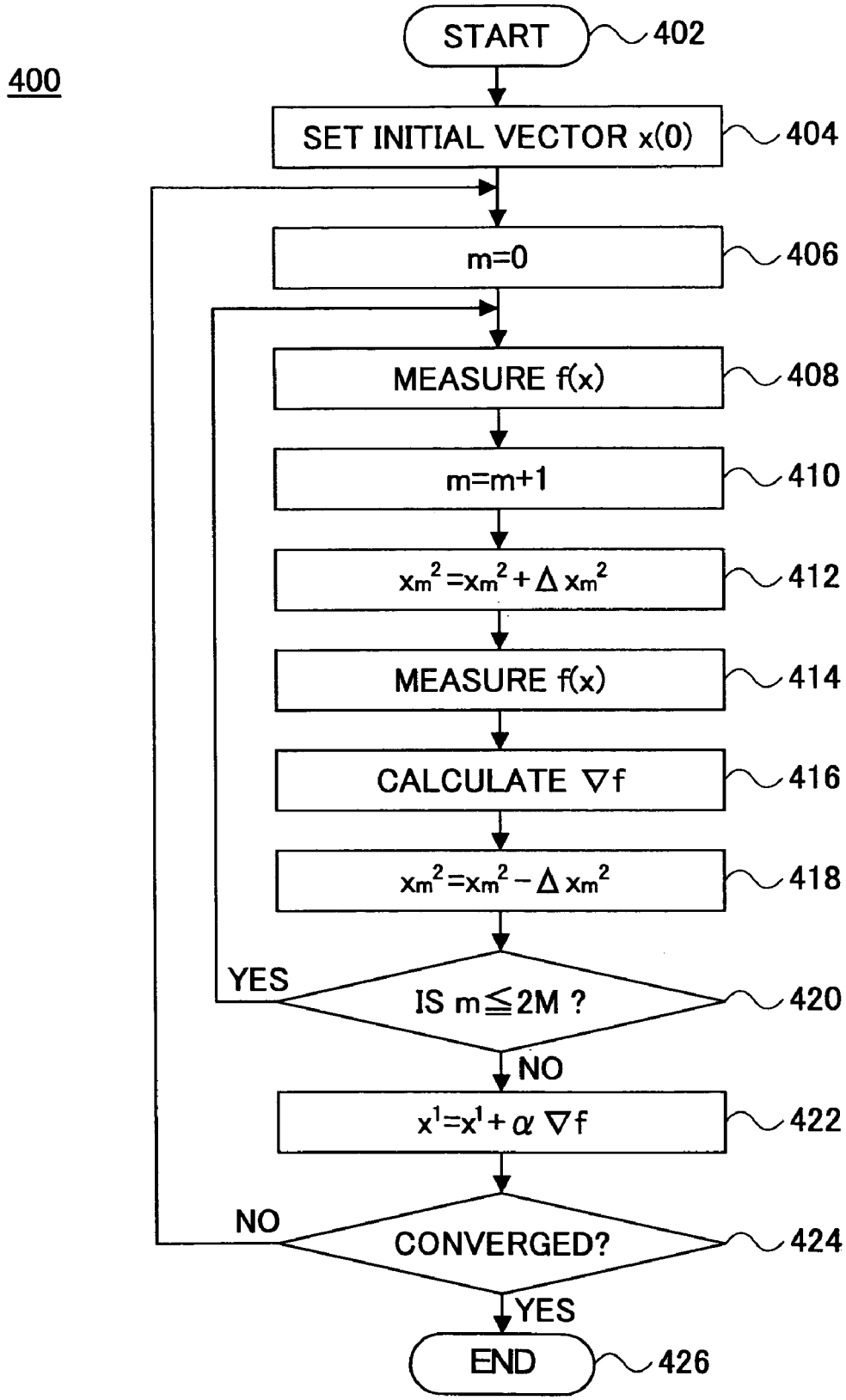
FIG. 4 is a control flowchart performed by the control system according to the embodiment of the present invention.

FIG. 4 shows a control flow 400 based on the perturbation method performed by the control unit 308 of the present embodiment. The control flow 400 starts at Step 402. At Step 404, impedance $x_i$ of the first and the second components (inductors $L_i^1$ and $L_i^2$, capacitors $C_i^1$, and $C_i^2$) are set at a suitable initial value. At Step 406, the value of a parameter m relevant to the number of process repetitions is set at an initial value 0.

At Step 408, the evaluation function value f(x) is obtained, where f(x) changes depending on the output signal y(x) from the analog-to-digital converter 306 (FIG. 3), where $x=(x_1^1, x_1^2, x_2^1, x_2^2, \ldots, x_{2M}^1, x_{2M}^2)$. The evaluation function value f(x) is calculated by the evaluation function value calculating unit 311, and is stored as a fiducial point $f_0(x)$.

At Step 410, the value of the parameter m is incremented by one.

At Step 412, the value of the impedance $x_m^2$ of the m-th second component is changed to $x_m^2 + \Delta x_m^2$ using the second changing unit 318. For example, if m=1, a minute change $\Delta x_1^2$ is added to the value of the second inductor $L_1^2$. The output signal y(x) changes by the minute impedance change $\Delta x_m^2$. At Step 414, the evaluation function value f(x) is calculated based on the output signal y(x).

At Step 416, the gradient vector ∇f is calculated by computing the difference between the evaluation function values f(x) before and after change of the impedance $x_m^2$ of the second component. The gradient vector calculating unit 312 calculates the gradient vector ∇f. Here, ∇f is a vector quantity that has 2M components, and each component is calculated by the following formula.

$$(\nabla f)_{xm} = f(x_1^1, x_1^2, \ldots, x_m^1, x_m^2 + \Delta x_m^2, \ldots, x_{2M}^1, x_{2M}^2) - f_0(x_1^1, x_1^2, \ldots, x_m^1, x_m^2, \ldots, x_{2M}^1, x_{2M}^2)$$

In addition, unlike the conventional practice, the total number of the variable impedance components in the present embodiment is 4M, i.e., 2M first components and 2M second components, and accordingly, the evaluation function value f(x) depends on the 4M impedance values ($f=f(x_1^1, x_1^2, x_2^1, x_2^2, \ldots, x_{2M}^1, x_{2M}^2)$. However, since the second components ($x_i^2$) are auxiliary impedance components prepared for the perturbation calculation at coordinates $x_1^1, x_2^1, \ldots, x_{2M}^1$ on an f-curved surface, the number of components of the gradient vector ∇f is defined by the number of the first components, i.e., 2M.

At Step 418, the minute change is deducted such that the impedance value returns to the original value $x_m^2$.

At Step 420, whether the value of parameter m is equal to or less than 2M is determined. If affirmative, the process returns to Step 408, and other components of the gradient vector are calculated. Otherwise, i.e., if negative, and if the value of the parameter m is not equal to or less than 2M, it is determined that all the components of the gradient vector ∇f have been calculated.

Unlike the conventional practice, the gradient vector ∇f is calculated by changing the impedance of the second components $L_i^2$ and $C_i^2$ that are prepared in addition to the first components $L_i^1$ and $C_i^1$. Although the variable impedance range of the second components is smaller than the first components, the response speed of the second components is high because the size is small. For this reason, the addition at Step 410 and the subtraction at Step 418 of the minute change $\Delta x_m^2$ are carried out at a high speed. In this manner, the gradient vector ∇f is quickly obtained. That is, if the influence of the minute change of the impedance to the evaluation function is known, it is possible to obtain the gradient vector ∇f. In other words, it is not necessary to greatly change the impedance (what is necessary is just to carry out a minute change) to determine the gradient vector ∇f. In this manner, according to the present invention, the gradient vector ∇f is quickly obtained by providing the second components $L_i^2$ and $C_i^2$, response of which is remarkably quick, in addition to the first components.

For example, since the first and second inductors of the phase shift circuit 310 are connected in series, a total inductance $L_i^0$ is equal to $L_i^1 + L_i^2$. The total inductance $L_i^0$ is changed by the minute change at Step 412 to $L_i^1 + L_i^2 + \Delta L_i^2$, which is equal to $L_i^0 + \Delta L_i^2$. Similarly, since the first and second capacitors of the phase shift circuit 310 are connected in parallel, a total capacitance $C_i^0$ is equal to $C_i^1 + C_i^2$. The total capacitance $C_i^0$ is changed by the minute change at Step 412 to $C_i^1 + C_i^2 + \Delta C_i^2$, which is equal to $C_i^0 + \Delta C_i^2$. Accordingly, the influence of the minute change of the inductor and/or the capacitor of the phase shift circuit 310 is detected for calculating the gradient vector.

At Step 422, the impedance value $x_i^1$ of the first component is updated using the gradient vector ∇f calculated based on the change due to the minute impedance change of the second-component. As described above, the gradient vector ∇f shows the direction in which the inclination changes the most rapidly at the points $x_1^1, x_2^1, \ldots,$ and $x_{2M}^1$ on the f-curved surface. The maximum or the minimum value (the desired optimal value) of the evaluation function value f is present in the direction that is given by ∇f. The parameter α represents a step size when following a pass along the direction indicated by ∇f when updating the impedance value $x_i^1$ of the first component.

At Step 424, it is determined whether the impedance value is sufficiently converged by comparing it with the immediately previous impedance value. If the determination is negative, the process returns to Step 406 for further updating. If, otherwise, the determination is affirmative, the process proceeds to Step 426 and the control flow 400 is ended.

According to the embodiment of the present invention, the impedance control is carried out at a remarkably high speed. In the case of the conventional practice, the process loop between Step 208 and Step 220 contains impedance value changes at Steps 210 and 220, which require a long time. In contrast, the present invention changes the impedance of the second components $L_i^2$ and $C_i^2$, response time of which is remarkably short; and therefore, the process loop between Steps 408 and 420 can be quickly performed. For example, if M is set at 10, there are 11 antenna elements, 10 inductors, and 10 capacitors, i.e., 20 components, impedances of which are adjusted. Suppose the response speed of the components is 100 kHz (i.e., it takes 10 μs to change the impedance). Conventionally, the loop that includes Step 212 and Step 218 for repeatedly calculating the gradient vector sequentially changes the impedance of the 20 components. A time required by this process is 20×(10 μs+10 μs). Further, suppose that the updating calculation as above is repeated 100 times before converging (i.e., Step 222 is carried out 100 times), and that the time required by Step 222 is 10 μs. Then, the total time required for obtaining the optimized impedance value is ((10 μs+10 μs)×20 times+10 μs)×100 times=41 ms. Here, in order to simplify explanation, the time required by steps other than Steps 212, 218, and 222 in the control flow 200 is omitted.

In contrast, according to the present invention, the second components are small sized, and have a remarkably high response speed. For example, the second components used by the present invention have a small impedance variable range, such as 1/512 of the first components; however, the response speed is as high as 51.2 MHz (i.e., 10 μs/512). (Here, for simplicity, the response speed is assumed to be in inverse-proportion to the variable range.) Accordingly, the time required to calculate the gradient vector ∇f by repeating the loop containing Step 412 and Step 418 20 times becomes (10 μs/512+10 μs/512)×20. Further, the time required by Step 422 is made equal to the time required by Step 222, i.e., 10 μs, Step 422 being repeated 100 times. Therefore, the total time required for optimizing the impedance by the present invention becomes about ((10 μs/512+10 μs/512)×20+10 μs)×100 times=1.1 ms.

In this manner, the control unit and the control method according to the present invention embodiment realize a very high-speed control. Here, in order to simplify explanation, the time required by steps other than Steps 412, 418, and 422 in the control flow 400 is omitted.

Figure 5:
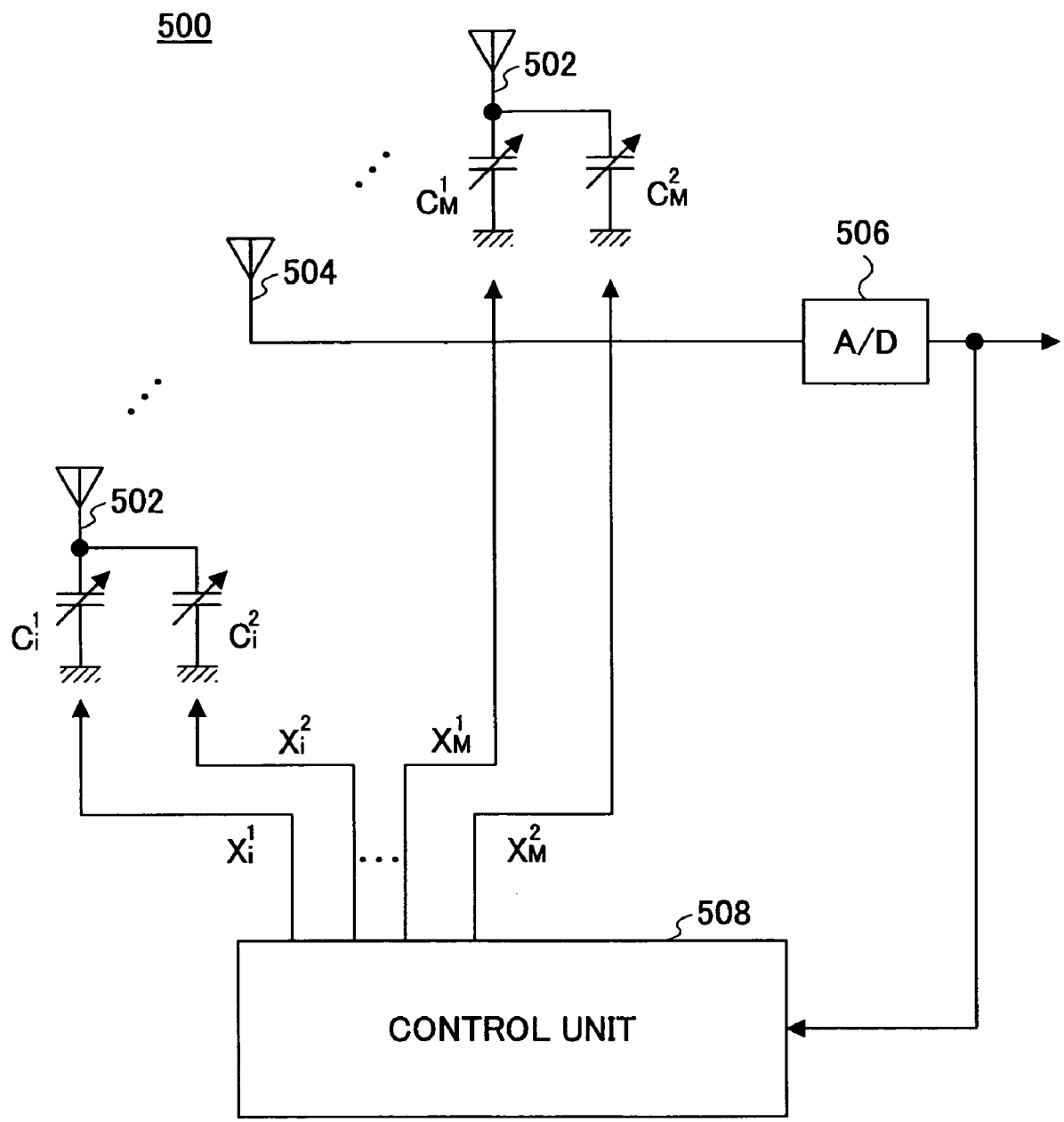
FIG. 5 is a block diagram of the control system according to the second embodiment of the present invention.

FIG. 5 is a block diagram of a control system 500 according to the second embodiment of the present invention. The control system 500 serves as a space processing type array antenna system, which is a nonlinear system with two or more antenna elements 502, of which the impedance of the RF component (C) is unknown, wherein a signal received by an antenna element 504 varies with changes of the impedance. The control system 500 includes M antenna elements 502, and the antenna element 504 that is connected to an analog-to-digital converter 506. The output of the analog-to-digital converter 506 is provided to a control unit 508 that is the same as the control unit 308 explained with reference to FIG. 3. Each of the M antenna elements 502 includes a first capacitor $C_i^1$ that functions as the first component, and a second capacitor $C_i^2$ that functions as the second component affecting the directivity of the array antenna. The control unit 508 controls the capacitance of the first and second capacitors $C_i^1$ and $C_i^2$.

Figure 1:
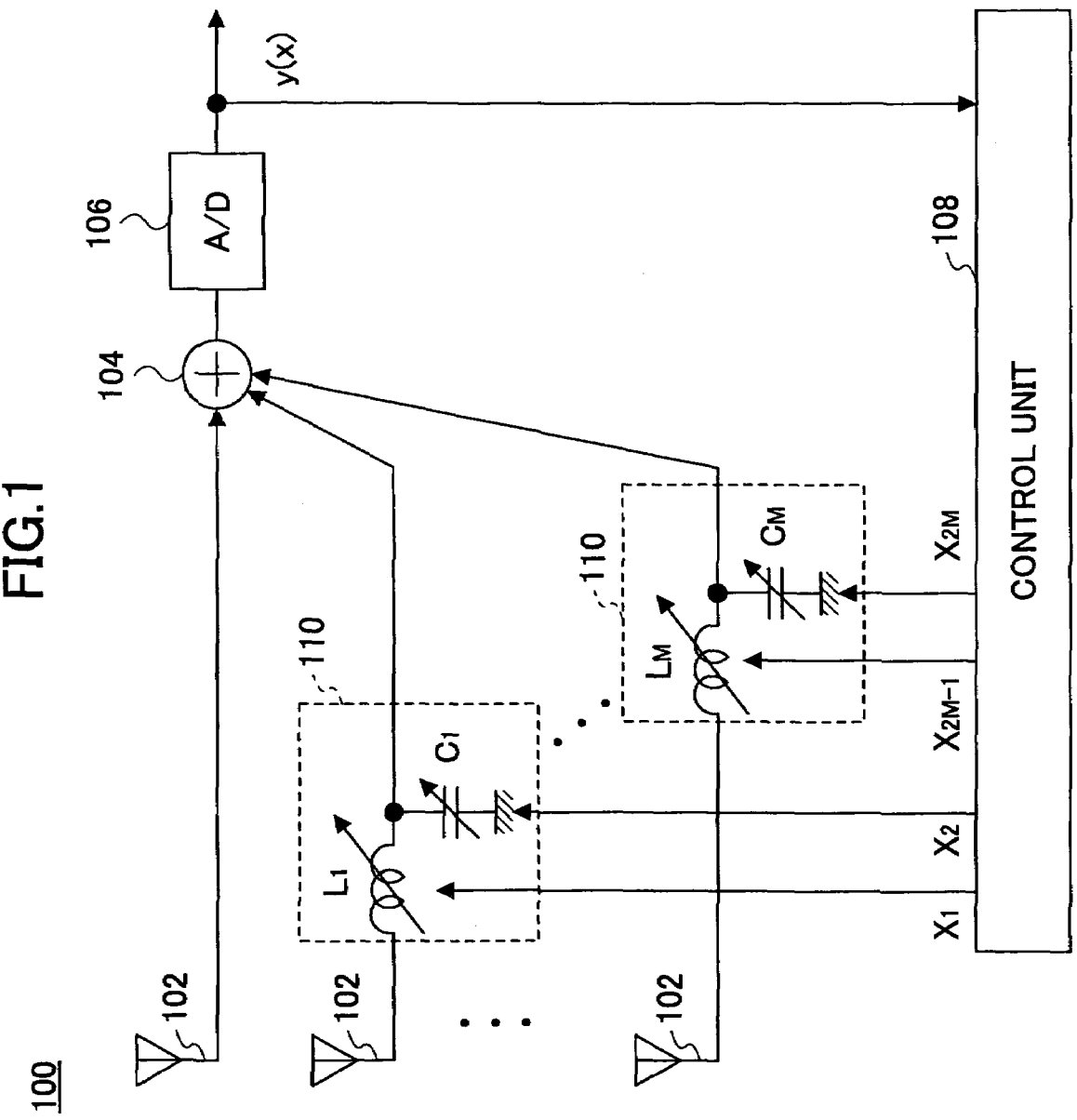
FIG. 1 is a block diagram of an example of a conventional control system.
Figure 2:
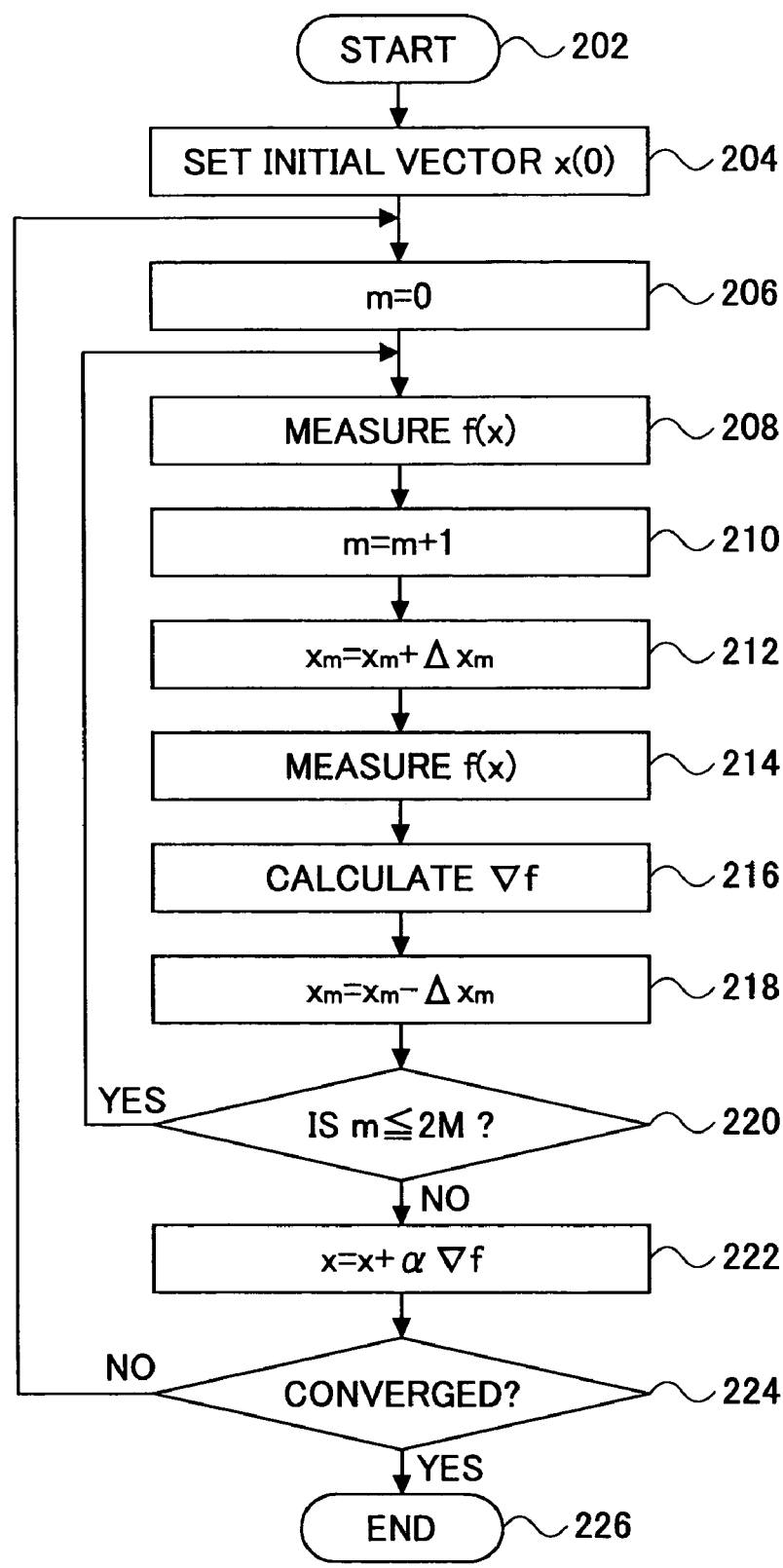
FIG. 2 is a control flowchart performed by the conventional control system.

Unlike the first embodiment wherein the phases of the received signals are adjusted, and the received signals are combined, the second embodiment is to maintain satisfactory signal reception by realizing a predetermined antenna directivity with the M+1 antenna elements spatially coupled. For example, the antenna directivity formed by the antenna elements is adjusted such that a desired signal is best received by setting a main lobe to the direction of the desired wave, and setting a null point to an interference wave. The impedance of the first component is optimized by performing a control flow that is the same as described above with reference to FIG. 2. According to the second embodiment, only the M first capacitors $C_i^1$ that accompany M respective antennas, and the M second capacitors $C_i^2$ for giving minute impedance change to the respective antenna elements are to be controlled. That is, the number of the components that are to be controlled is reduced, which is an advantage of the second embodiment, especially when applying the present invention to small apparatuses.

Figure 6:
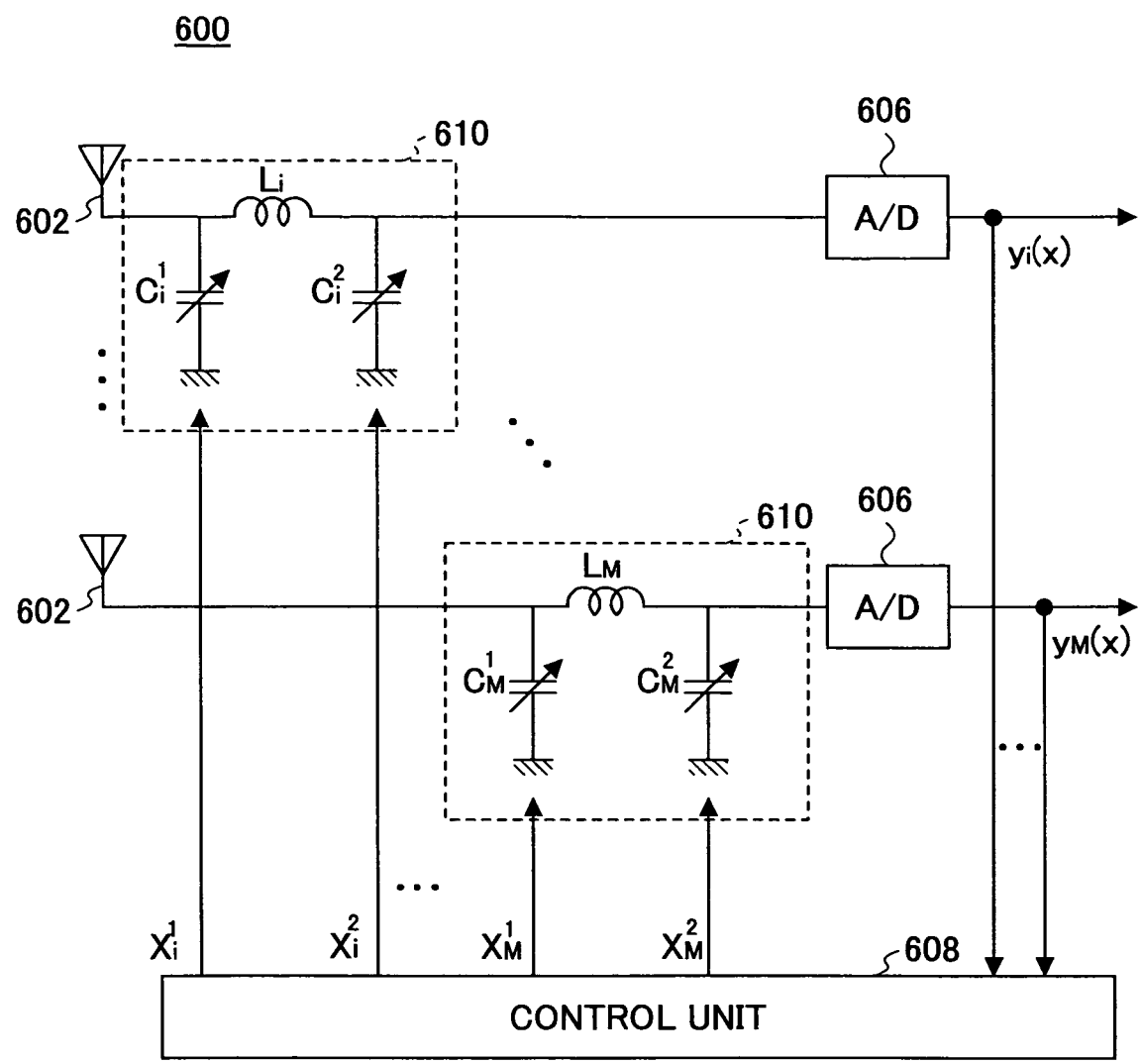
FIG. 6 is a block diagram of the control system according to the third embodiment of the present invention.

FIG. 6 is a block diagram of a control system 600 according to the third embodiment of the present invention. The control system 600 serves as a digital processing type array antenna system, and includes antenna elements 602, each of which further includes a matching circuit 610 for taking impedance matching, and an analog-to-digital converter 606. The matching circuit 610 includes a first capacitor $C_i^1$ that functions as the first component connected in parallel with the antenna element 602, a second capacitor $C_i^2$ that functions as the second component, and a coil $L_i$ connected in series to the antenna element 602 (i=1, . . . , M). The impedance of the first and the second component are adjusted based on control signals $x_i^1$ and $x_i^2$, respectively, provided by a control unit 608.

According to the present embodiment, the evaluation function value f(x) is calculated based on the total of the signals received through each path of the antenna elements 602. Specifically, the evaluation function value f(x) is calculated by obtaining a power value by squaring the received signal $y_i(x)$ from each path, and totaling the power values. That is, according to the embodiment, a signal is appropriately received by adjusting matching of the impedance of each antenna element. In addition, the matching circuit 610 of the embodiment can be effectively used by the control system according to the first embodiment and the second embodiment.

As described above, according to the embodiments of the present invention, two or more second components $x_i^2$ that affect the output signal of a nonlinear system are provided in addition to two or more first components $x_i^1$, the gradient vector ∇f is obtained using the second components, and the impedance of the first components is changed based on the gradient vector ∇f. Since the gradient vector ∇f can be obtained by providing a minute change of the impedance that affects the output signal, the size of the second components can be very small, which means that the second components have a high-speed response. That is, the gradient vector ∇f can be quickly obtained using the second components. Since the first components need to change the impedance more extensively than the second components, size of the first components is greater than the second components, and the response speed is lower than the second components. The impedance of the first components is adjusted based on the quickly obtained gradient vector ∇f so as to obtain the maximum or the minimum output signal.

According to the embodiments of the present invention, an output signal is formed based on the high-frequency signals received by the antenna elements, and the first and the second components consist of capacitors and inductors. Conventionally, use of the mechanical component (MEMS) type capacitors and inductors is considered in an attempt to reduce power consumption as compared with semiconductor devices; however, the response speed of the MEMS type components is low, and it is difficult to employ the MEMS type components. Since the present invention uses small size MEMS type components as the second components for determining the gradient vector ∇f, a high-speed operation is realized. Accordingly, high-speed control of the first components is realized, and power consumption is reduced.

Further, the present invention is capable of setting up different magnitudes of the minute change $\Delta x_m^2$ for each of the antenna elements (that is, different antenna elements can take different minute changes). This feature makes the present invention applicable to various control systems. Of course, all the minute changes $\Delta x_m^2$ may be set at the same predetermined fixed value, in which case, the processing burden of the control system is mitigated, and a high-speed operation is obtained.

The control system of the present invention can be applied to any system using two or more antenna elements such as a radio base station, a mobile terminal, and the like, especially where reduced power consumption is a requirement, e.g. a small portable apparatus. Further, although the variable impedance components are used to form the phase shift circuit, the reactance circuit, and the matching circuit in the embodiments above, the present invention is not limited to such a form; but variable impedance components can form various circuits that are configured to affect an output signal. Furthermore, although the present invention is described in relation to the antenna system, the present invention is not limited to such a form. Rather, the present invention can be widely applied to control systems wherein impedance of two or more components of a nonlinear system, where an output signal changes depending on the impedance, is optimized by the perturbation method.

As described above, according to the control unit and the control method of the present invention, the impedances of two or more components that affect an output signal are controlled at a high speed in order to satisfactorily maintain the output signal of the nonlinear system.

Further, the present invention is not limited to these embodiments, but variations and modifications may be made without departing from the scope of the present invention.

What is claimed is:

1. A control unit, comprising:
   a first changing unit configured to change impedance of each of a plurality of first components that affect a property of an output signal, said impedance being changed within a first range;
   a second changing unit configured to change impedance of each of a plurality of second components that affect the property of the output signal, said impedance being changed within a second range that is narrower than said first range;
   an evaluation function value calculating unit configured to calculate an evaluation function value that is dependent on said impedances of said first and said second components based on said output signal; and
   a gradient vector calculating unit configured to calculate a gradient vector based on a difference between the evaluation function values before and after said impedance of said second component is changed,
   wherein said impedance of each of said first components is adjusted based on said gradient vector such that said evaluation function value takes a desired value.

2. The control unit as claimed in claim 1, wherein said second components are made by micro electro mechanical systems, the impedance of said second components being mechanically changed.

3. The control unit as claimed in claim 1, wherein said first components and said second components are constituted by inductors, each of said first components being connected in series to respective second components.

4. The control unit as claimed in claim 1, wherein said first components and said second components are constituted by capacitors, each of said first components being connected in parallel with respective second components.

5. The control unit as claimed in claim 1, wherein said first and said second components are connected to respective antenna elements.

6. The control unit as claimed in claim 5, wherein each of said first components and respective second components concerning respective antenna elements are connected such that a phase shift circuit is formed.

7. The control unit as claimed in claim 5, wherein each of said first components and respective second components concerning respective antenna elements are connected such that a matching circuit is formed.

8. The control unit as claimed in claim 5, wherein each of said first components and respective second components form a reactance circuit of respective antenna elements.

9. The control unit as claimed in claim 5, wherein said evaluation function value calculating unit determines said evaluation function value by calculating correlation between said output signal and a predetermined reference signal.

10. The control unit as claimed in claim 5, wherein said evaluation function value calculating unit determines said evaluation function value based on total of power of signals received by said antenna elements.

11. The control unit as claimed in claim 5, wherein said evaluation function value calculating unit determines said evaluation function value based on at least signal strength and noise intensity of said output signal.

12. The control unit as claimed in claim 1, wherein an amount of change of said impedance of said second component is a constant value.

13. The control unit as claimed in claim 1, further comprising:
   a digital-to-analog converter configured to convert a digital output from said first and said second change units into an analog value.

14. A mobile terminal comprising:
   a plurality of antenna elements; and
   the control unit as claimed in claim 1.

15. A radio base station comprising:
   a plurality of antenna elements; and
   the control unit as claimed in claim 1.

16. A method for a control apparatus configured to set an evaluation function value to a desired value, the evaluation function value being calculated based on an output signal that is changed by a change of impedance of a plurality of first components within a first predetermined range, comprising: a step of calculating a gradient vector of said evaluation function value; and a step of changing said impedance of said first components based on said gradient vector, wherein said step of calculating the gradient vector repeats the following steps for a predetermined number of times: a step of changing impedance of each of second components within a second predetermined range that is narrower than said first predetermined range; a step of determining a difference between evaluation function values before and after changing said impedance; and a step of removing said impedance change.

* * * * *